United States Patent
Fallahassady

(10) Patent No.: US 10,689,534 B2
(45) Date of Patent: Jun. 23, 2020

(54) AQUEOUS DRY-ERASABLE INK COMPOSITION

(71) Applicant: Ali Fallahassady, Santa Monica, CA (US)

(72) Inventor: Ali Fallahassady, Santa Monica, CA (US)

( * ) Notice: Subject to any disclaimer, the term of this patent is extended or adjusted under 35 U.S.C. 154(b) by 202 days.

(21) Appl. No.: 15/895,337

(22) Filed: Feb. 13, 2018

(65) Prior Publication Data
US 2019/0249019 A1    Aug. 15, 2019

(51) Int. Cl.
*C09D 11/16* (2014.01)
*C09D 11/17* (2014.01)

(52) U.S. Cl.
CPC .............. *C09D 11/16* (2013.01); *C09D 11/17* (2013.01)

(58) Field of Classification Search
CPC ................................ C09D 11/16; C09D 11/17
See application file for complete search history.

(56) References Cited

U.S. PATENT DOCUMENTS

| 2006/0063856 A1* | 3/2006 | Cordova | C09D 11/16 523/160 |
| 2010/0063186 A1* | 3/2010 | Onyenemezu | C09D 11/17 524/114 |
| 2012/0009005 A1* | 1/2012 | Czubarow | B43K 1/006 401/198 |

OTHER PUBLICATIONS

Safety Data Sheet for MP-BL6182 (Revised Jun. 1, 2018, version 4, p. 1-8).*

* cited by examiner

*Primary Examiner* — Kortney L. Klinkel

(57) ABSTRACT

The present invention provides an aqueous dry-erasable ink or marking composition, which could be applied to both porous and non-porous surfaces and erasable from both porous and non-porous surfaces or marking substrates. The present invention further provides erasure of mark made by the ink composition from such porous and non-porous substrate, which is achieved by a cloth or the like, without requiring rubbing by conventional erasers. The ink composition comprises water, composite pigment, one or more rheology additive, one or more wetting agent, one or more water-soluble resin, pH adjuster and one or more biocide. The composite pigment is a compound of polymer resin and colored pigment at a weight ratio from 10/90 to 97/3.

12 Claims, No Drawings

AQUEOUS DRY-ERASABLE INK COMPOSITION

BACKGROUND OF THE INVENTION

A. Technical Field

The present invention generally relates to erasable ink composition, and more specifically relates to an aqueous dry erasable composition for writing instruments such as markers with ball tip, suitable for use on non-porous and porous surfaces.

B. Description of Related Art

Currently, erasable inks are used on the surfaces of the whiteboards for presentation purposes. On some stage they successfully replaced the traditional chalk, which for centuries was the main instruments for such task. Other example of erasable marks technology includes special ink for pens, mainly ball tipped, which, upon the application and subsequent short drying, can be erased from the surface with rubber, like a pencil marks.

However, the known technology approaches usually need a special type of a substrate, which they were developed for. The main principle of whiteboard marker functioning is based on the use of special low energy coating of such surface and special ingredient of the ink—the release agent. It migrates to a surface after ink application, thus providing the weak adhesion force between the mark and the substrate. This fact lets the mark to be easily removed with a special type of cloth, as the ink is absorbed by said cloth as it described in CN106433307 (A). So, this approach is limited by the necessity of special surface (low energy non-porous surface) for writing and special erase instrument use.

In the case of erasable pen marks, the erasability is provided by the incorporation of relatively coarse particles of pigments or a resin with volume average particle size in range 3-20 μm into the ink composition as it described in JP2004204036 (A) and JP2004197011 (A) or encapsulated pigment particles as described in JP2003138194 (A). After ink drying these particles forming a microtexture of mark surface, which can be easily removed by erasing instrument, for example conventional eraser. The erase process is based on the "sticking" of this particles to an eraser surface and, thus, detachment from a paper. This process is improved by the selection of ink components with a low glass transition temperature, as it described in JPH08199103 (A). It simplifies the detachment stage and thus, the erasability in general. However, as this technology was designed for the paper substrates, it's best performance application is limited with such surfaces and involves the use of erasing instrument.

Hence, there is a need for an aqueous dry-erasable ink composition, which could be applied to both porous and non-porous surfaces and erasable from both porous and non-porous surfaces.

SUMMARY OF THE INVENTION

It is an object of the present invention to provide an aqueous dry-erasable ink or marking composition.

It is another object of the present invention to provide an aqueous dry-erasable ink composition, which could be applied to both porous and non-porous surfaces and erasable from both porous and non-porous surfaces.

It is still another object of the present invention to provide an aqueous dry-erasable ink composition as described above, could be readily applied to and erased from both porous and non-porous surfaces or marking substrates including, but not limited to glass panels, plastic panels, metal panels, wood panels, coated paper surfaces, other smooth-surfaced writing panels, whiteboards, blackboards, concrete, wood, plastic and interior wall paintings.

It is still another object of the present invention to provides erasure of mark made by the present composition from such porous and non-porous substrate, which is achieved by a cloth or the like, without requiring rubbing by conventional erasers.

These objects and other objects of the present invention either individually or collectively, have been satisfied by the discovery of an aqueous dry erasable ink including water, composite pigment, one or more rheology additive, one or more wetting agent, one or more water-soluble resin, pH adjuster and one or more biocide. The composite pigment is a compound of polymer resin and colored pigment or colorant, with weight ratio from 10/90 to 97/3. The average particle size of the composite pigment varies from range between 20-60 μm.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses an aqueous dry-erasable ink or marking composition, which could be applied to both porous and non-porous surfaces and erasable from both porous and non-porous surfaces or marking substrates including, but not limited to glass panels, plastic panels, metal panels, wood panels, coated paper surfaces, other smooth-surfaced writing panels, whiteboards, blackboards, concrete, wood, plastic and interior wall paintings. The aqueous dry-erasable ink composition is hereinafter referred as ink composition. The present invention provides erasure of mark made by the ink composition from such porous and non-porous substrate, which is achieved by a cloth or the like, without requiring rubbing by conventional erasers.

In an embodiment, the ink composition comprises water, composite pigment, one or more rheology additive, one or more wetting agent, one or more water-soluble resin, a pH adjuster and one or more biocide. In another embodiment, the ink composition comprises water, composite pigment, one or more rheology additive, one or more wetting agent, one or more water-soluble resin, pH adjuster, one or more biocide and other additives. In an embodiment, the composite pigment particle used is a coarse type particle to avoid filtration into common porous substrates and the film-forming component is accurately balanced on a base of particles surface activity. This is because, the main principle of erasability of marks is in the complete absence of permeation of colored paint components into the substrate. And to provide the easy wipe-out of the marks, the dry material should have decreased cohesion between its elements. The present invention uses composite pigments having average particle size varies from 20 to 60 μm. The composite pigment content of fractions less than 10 μm and more than 65 μm is avoided. In case of presence of particles with less than 15 μm size, the ink would leave hardly removable marks on porous substrates like paper and wood. And in case, if the fraction with particle size more than 65 μm present, the problem with ink flow (marker nozzle clogging) and pigment settling would arise.

Preferably, the composite pigment of the present invention is a compound obtained by the melt mixing of a polymer resin with colorants or pigments and then grinded and fractioned in the one of known ways. In an embodiment, the resin could be thermoplastic. In another embodiment, the resin could be thermoset. More preferably, the polymer resin could be selected from a group of epoxy, polyurethane, polyester or acrylic resins.

In an embodiment, the composite pigment is selected from water insoluble substances, which are commonly used in the industry as organic and inorganic pigments and colorants. In an embodiment, the water insoluble substances include, but not limited to, industrially available carbon black, titanium dioxide, phtalocyanine, lake, azo, quinacridone pigments.

The concentration of the pigment in the composite varies in the range from 3 to 90 wt %. Preferably, the concentration of the pigment in the composite varies from 12 to 50 wt %. More preferably, the concentration of the pigment in the composite varies from 20 to 50 wt %.

In an embodiment, the process of the composite pigment fabrication is similar, but not limited to, to the process of powder coating paint fabrication. The process includes the following steps: compounding/mixing a pigment or colorant and suitable additives with polymer melt using equipments known in the art such as hot melt barrel mixers or screw machines; b) extrusion of the compound in the form of ribbon or a film; c) grinding said film in specially designed blender and d) fractioning resulting particles by means of airflow or liquid fractioning equipment. The desired particle size distribution is obtained at the last step by respective sieves selection.

In another embodiment, the process of the composite pigment fabrication utilizes ready powder coating. The process involves fractioning of existing product for example by airflow or in the water-based media. This media preferably consists of the water and non-ionic surfactant in concentration 0.1-1 wt % to avoid particles coagulation during the step. The sieves which may be used for this operation have mesh sizes 625 and 270 for the fine and coarse tails filtration respectively.

The concentration of the pigment in the ink varies from 10 to 70 wt %. More preferably, the concentration of the pigment in the ink varies from 30 to 60 wt %. The higher concentrations range of pigment in the ink provide more sharp-cut marks with even borders, but too high pigment content may lead to the mark flow breaks and, finally, leads to clogging of marker tip. The pigment content less than 10% would lead to uneven distribution of the pigment particles inside the mark and thus uneven poor looking drawn lines.

In the ink composition of the present invention, the selected water-soluble resin and its content defines the easiness of marks erasability. In an embodiment, the water-soluble resin includes, but not particularly limited to polyvinyl alcohol, modified cellulose grades (e.g. Polyox grades from Dow Corning), hydroxyethyl or hydroxymethyl cellulose), xanthan and guar gums, polyacrylamide, corn starch, modified polyesters and polyethers, polyvinylpirrolidone, polyethyleneimine etc. The stated resins could be used either solely or in combinations depending on the formulation.

In an embodiment, the concentration of water soluble resin in the ink composition varies in the range from 0.05 wt % to 10 wt %, preferably from 0.1 wt % to 5 wt %. When the concentration of the resin is less than 0.05 wt %, the mark is mechanically vulnerable even to slight interactions, as the air stream and could be blown out of surface. When the concentration exceeds 10%, marks have poor erasability and could leave traces especially on porous surfaces as paper, wood and concrete. This happen due to the increased adhesion of the ink to said surfaces and improved cohesion between the composite pigment particles. In case, if the concentration of the water-soluble resin is in the specified limits, the marks after drying could be erased with a help of fabric cloth without leaving traces. In some aspect, the water-soluble resin could play a role of rheology agent, as usually such products are forming viscous gels in water solutions. Furthermore, in some formulations the rheology agent could be partially or completely replaced by a soluble resin if the desired flowability and ink long term storage stability without settling is provided.

In the ink composition of the present invention, the wetting agents performs two functions, which includes pigment wetting and stabilization and substrate wetting during the ink application. The type of a wetting agents or their mixtures is not particularly limited if it could provide abovementioned functions.

The ink composition preferably includes the wetting agents in amounts of from 0.05 to 5 wt %. If the concentration of the wetting agent in the ink composition is below 0.05 wt %, the pigment particles aggregation might occur leading to subsequent pigment settling. In addition, in such wetting agent concentration, due to the improper wetting of the substrate, leaved marks could gather into droplets, thus changing the configuration of drawn image. If the concentration of the wetting agent in the ink composition is above 5 wt %, excessive foaming might occur, leading to uneven traces and "pinhole" type defects of drawn lines.

In an embodiment, any of an amphoteric wetting agent, a non-ionic wetting agent, and an anionic wetting agent could be used as a wetting agent. In another embodiment, the combination of non-ionic wetting agents such as polyoxyethylene alkyl phenyl ether, polyoxyethylene alkyl ester, polyoxyethylene alkylamine, polyoxyethylene alkylamide, polyoxyethylene propylene block polymer, Sorbitan fatty acid ester, polyoxyethylene sorbitan fatty acid ester and an ethylene oxide adduct of acetylene alcohol are preferably used and anionic surfactant as sodium polyacrylate, ammonium polyacrylate, sodium lauryl ester sulfate are preferably used in terms of a relationship between dispersing stability of the composite pigment and surface wetting quality.

The ink composition of the present invention comprising rheology additives provide pigment settling stability and satisfactory flow of the ink then applied on a substrate. In an embodiment, the ink composition uses additives, which provide a pseudoplastic (shear thinning) flow of the ink and have thixotropic properties. The latter is desirable in terms of composite pigment particles settling avoidance.

The ink composition preferably includes such additives in amounts from 0.05 to 3 wt %, more preferably from 0.05 to 1.5 wt %. If the concentration of rheology additives exceeds 3 wt %, the ink becomes too thick and cannot be supplied to the substrate through the marker gap. If the concentration of the additive is less than 0.05 wt %, settling stability of ink would not be enough and results in marker gap clogging occurs upon the ink application.

In an embodiment, the ink composition uses rheology additives, which could give satisfactory settling stability of composite pigments and unbroken marks appearance. Examples of such rheology additives include, but not limited by, the carboxymethyl cellulose, ethyl cellulose, methyl cellulose, xanthan gum, guar gum, agar, acrylic thickeners, associative thickeners such as Hydrophobe-modified Ethoxylated Urethane (HEUR) and HPME. In another embodiment, inorganic thickeners, such as hydrophilic clays and silicon dioxide are used as rheology additives. In case of inorganic thickeners, limited concentration is used as problems with adhesion would occur.

The ink composition of the present invention comprises pH adjuster to provide functioning stability to rheology additive. For example, modified cellulose and acrylate thickeners are properly working only in definite pH range from 5.0 to 8.0 and from 6.0 to 12, respectively and do not tolerate the moderate and high acidity levels. In an embodiment, a desired range of pH adjuster is used.

In another embodiment, the desired pH range of the ink preferably lies in the range between 4.0 to 12.0 and more preferably from 6.0 to 9.0.

In another embodiment, the ink composition compounded without a use of pH adjuster with the rheology additive, which is not pH-sensitive. In an example, such pH adjusters include but not limited to, metal hydroxides, carbonates, hydrocarbonates, quaternary ammonium bases and their salts, diethanolamine, triethanolamine, phosphates of alkali metals.

In an embodiment, the ink composition of the present invention contains one or a combination of water-soluble biocides including algaecides and fungicides. The necessity of the use of such additives is determined by weak bio-resistance of water soluble components, used as thickeners and resins in the formulation. Furthermore, during the contact with the environment, the contamination of ink media with bacteria or fungi is also highly probable. The concentration of the biocide used is determined in this invention only by its bio-suppression activity and the concentration of biocide ranges from 0.005 to 1.5 wt %. In an embodiment, the biocides include, but not limited to 1,2-benzisothiazolin-3-one, sodium benzoate, sodium dehydroacetate, sodium sorbate, sodium pentachlorophenol, and sodium 2-pyridinethiol-1-oxide, cetyltrimethylammonium bromide, etc.

The invention is further explained in the following examples, which however, are not to be construed to limit the scope of the invention.

EXAMPLES

While it is believed that one of skill in the art is fully able to practice the invention after reading the foregoing description, the following examples further illustrate some of its features. As these examples are included for purely illustrative purposes, they should not be construed to limit the scope of the invention in any respect. In the descriptions in the following examples, the numbers represent weight ratios in parts, unless otherwise specified.

Example 1

Epoxy resin EPOXY-520 (Spolchemie, Czech Republic) and the hardener Epilox H 10-34 (Leuna Harze, Germany) were taken at weight ratio 1:0.5, heated to 40° C. and mixed in laboratory mixer at 150 rpm for 2 minutes. The total weight of the mixture was 75 g. The blue phtalocianine pigment "Pigment blue 15:3" (Hangzhou Pigment Chemicals Plant, China) was added to the mixture in the form of powder at 200 rpm in quantity of 20 g and mixed for 5 minutes. The mixture was poured into the silicone form to get a layer of less than 3 mm thickness ant put into laboratory oven to harden at temperature 60° C. for 4 hours. Thus, obtained composite after cooling down to a room temperature was crushed in a ball mill (0.5-1 volume, ceramic milling bodies) for 3 hours. The resultant powder then was sieved through a sieve with mesh size 270 mesh to cut of the fraction of the pigment larger than 53 μm and then fractioned using water media with non-ionic surfactant additive in concentration 0.5 wt %. The liquid fractioning procedure included washing out of the fraction less than 20 μm by repeatable separation of the top 10 cm of the solution for 18 minutes. After the separation, the top part replaced with water-surfactant mixture and cycle repeated to the moment in 18 min when the said top part of the solution was clear after stirring. Then the rest of pigment water slurry was put into Buchner funnel and the water was removed. The pigment was additionally washed with deionized water 3 times. At the next step the powder was placed to a paper substrate and dried at temperature 60° C. for 12 hours. After drying it was removed from a paper substrate by a cotton cloth and disaggregated in laboratory hand mortar. The volume average particle size of the composite pigment thus obtained was determined by means of laser sedimentometry (Fritsch Particle Sizer Analysette 22) and is 26 μm.

The ink liquid part was prepared by addition of the biocide (1,2-benzisothiazolin-3-one, WB035137SU, Wubei-Biochem) into the deionized water and stirring to full dissolution of the latter, adding the water soluble resin (xanthan gum, FCC 3 USP NF, W.Ulrich GMBH) and stirring to obtain homogeneous solution, adding the rheology additives (Hydrohyethyl cellulose, Cellosize QP 3000, Dow Chemical company), mixing at speed 50 rpm for 2 minutes, adding the pH adjuster (0.01 M sodium hydroxide water solution) to the desired level of pH (7-8) and rheology additive activation, what was evident from the visual uniformity of the solution and viscosity build up. Next, the wetting agents (surfactants mixture: Hydropalat 1080 from Cognis and Hydropalat® WE 3323 in weight ratio 2:1) were added. At the last stage, the powder composite pigment was added to form ink. The introduction of the pigment was performed at 75-100 rpm and the system was additionally mixed for 10 minutes. The components weight ratio is given at the Table. 1, below:

TABLE 1

| Components and Its Weight Ratio | | |
| --- | --- | --- |
| Introduction order | Component | Wt % |
| 1 | Deionized water | 52.630 |
| 2 | Biocide | 0.020 |
| 3 | Water soluble resin | 0.050 |

TABLE 1-continued

Components and Its Weight Ratio

| Introduction order | Component | Wt % |
| --- | --- | --- |
| 4 | Rheology additive | 0.100 |
| 5 | pH adjuster | 0.001 |
| 6 | Wetting agent | 1.200 |
| 7 | Composite pigment | 46.000 |

Example 2

The procedure for preparation of the composite pigment in Example 1 was repeated except for replacing the blue pigment 15:13 with carbon black Nerox 500 (Orion Engineered Carbons) in quantity of 12 g. The next steps of the compound hardening, grinding, composite pigment fractioning and the ink preparation were done as described in Example 1. The mean average particle size of the composite pigment in this case was 30 µm.

Example 3

The powder coating paint RAL 7026 from Lacover (Ukraine) was taken as it is and used for the composite pigment preparation except for the fractioning procedure, which was done as follows. The powder paint was placed on the sieve frame with cell size 270 mesh. The second 625 mesh sieve was placed below the first. To wash the pigment, the solution of surfactant as described in Example 1 was used. The washing was done under continuous stream of said solution till the portion of liquid on the exit from the second sieve become optically clear. Further, the fractioned composite pigment was dewatered and dried as described in Example 1. The mean average particle size was 36 µm. The procedure of the ink preparation was the same as in Example 1 except for the formulation change by weight percent as follows:

TABLE 2

Components and Its Weight Ratio

| Introduction order | Component | Wt % |
| --- | --- | --- |
| 1 | Deionized water | 43.630 |
| 2 | Biocide | 0.020 |
| 3 | Water soluble resin | 0.000 |
| 4 | Rheology additive | 0.150 |
| 5 | pH adjuster | 0.001 |
| 6 | Wetting agent | 1.200 |
| 7 | Composite pigment | 55.000 |

Example 4

The ink was prepared by the procedure described in Example 3, except the following change of the formulation by weight percent:

TABLE 3

Components and Its Weight Ratio

| Introduction order | Component | Wt % |
| --- | --- | --- |
| 1 | Deionized water | 43.180 |
| 2 | Biocide | 0.020 |
| 3 | Water soluble resin | 0.000 |

TABLE 3-continued

Components and Its Weight Ratio

| Introduction order | Component | Wt % |
| --- | --- | --- |
| 4 | Rheology additive | 0.400 |
| 5 | pH adjuster | 0.001 |
| 6 | Wetting agent | 1.200 |
| 7 | Composite pigment | 55.000 |

Comparative Example 1

The procedure of preparation of composite pigment and the ink in Example 3 was repeated except for the fractioning stage. It was done by using air flow, generated by an industrial fan with a capacity 600 m3/h instead of water. The sieves complex remains the same as in Example 3. The mean average particle size was 22 µm, but at the particle size distribution curve by a fraction less than 20 µm was noticed in volumes 2-3 wt %.

Comparative Example 2

The procedure of preparation of composite pigment and the ink in Example 3 was repeated except for the fractioning stage. It was done by a simply sieving of the pigment through 270 mesh sieves and the upper part, which does not pass through a sieve was taken. The mean average particle size was 74 µm.

Comparative Example 3

The procedure of preparation of composite pigment and the ink in Example 3 was repeated except for the fractioning stage. It was done by a simply sieving of the pigment through 625 mesh sieves and the part, which passed through a sieve was taken. The mean average particle size was 12 µm.

The following properties of each of the inks of Examples 1 to 5 were evaluated. The results are shown in Table 4.

Erasability: Each of the inks described in Examples 1-4 and Comparative Examples 1-3 were loaded to the ball point marker. The steel ball diameter was 5 mm and the opening width when the ball is pressed in was 0.4 mm. The ink applied to the surfaces of the white stationery paper 80 g/cm2, matted PVC plastic, glass, gypsum board, carton, sanded spruce wood (number the final sandpaper used—400) and internal wall paint on the concrete substrate. The ink layer was dried for 30 min at 20° C. and then was wiped by a cotton cloth. The erasability of the ink was estimated using the visual inspection of traces with the following criteria: neither the main trace, nor the contour is present on the substrate; the ink left slightly visible mark contour after erasing; the main trace is visible; and the contour is visible.

Marker clogging: Each of the inks described in Examples 1-4 and Comparative Examples 1-3 were loaded to the ball point marker. The steel ball diameter was 5 mm and the opening width when the ball is pressed in was 0.4 mm. Markers were left for 15 days, and after completion of above mentioned days, shaken for 30 sec. 30 cm lines were drawn with each marker by uninterrupted straight move. The clogging was estimated by the following criteria: the line is smooth, without breaks; a little portion of the clear liquid is exuded at the beginning of drawing; the line is smooth, without breaks; the line contains up to 3 breaks, the clear liquid exudes; the line contains more than 3 breaks, the clear liquid exudes; and the marker was not able to draw the continuous line.

TABLE 4

Erasability and Clogging Characteristics of Ink

| | Erasability | | | | | | | |
|---|---|---|---|---|---|---|---|---|
| | Paper | PVC | Glass | Board | Carton | Wood | Paint | Clogging |
| Example 1 | A | A | A | A | A | A | A | B |
| Example 2 | A | A | A | A | A | A | A | A |
| Example 3 | A | A | A | A | A | A | A | A |
| Example 4 | A | A | A | A | A | A | A | A |
| Comparative Example 1 | D | A | A | D | D | C | D | A |
| Comparative Example 2 | A | A | A | A | A | A | A | D |
| Comparative Example 3 | D | A | A | D | D | D | D | A |

Above-mentioned, Table 1 proves each of the inks provided in Examples 1 to 3 has good erasability on multiple household substrates and shows no clogging after storage, if stirred before use. In contrast, Example 5 and Comparative Examples 1-3 do not satisfy the requirement of this invention, particularly the particle size distribution ranges, and thus unable to achieve the objects thereof.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An aqueous dry-erasable ink composition comprising, water, composite pigment, one or more rheology additive, one or more wetting agent, one or more water-soluble resin, pH adjuster, and one or more water-soluble biocide selected from the group consisting of sodium sorbate, sodium 2-pyridinethiol-1-oxide and cetyltrimethylammonium bromide, wherein the one or more water-soluble biocide constitutes 0.005 wt % to 1.5 wt % of the total composition, wherein the pH of the composition is 4 to 12, and wherein the composite pigment is a compound of polymer resin and colored pigment at a weight ratio ranges from 10/90 to 97/3 and has an average particle size range from 20 µm to 60 µm.

2. The aqueous dry-erasable ink composition of claim 1, wherein the composite pigment constitutes 3% to 90% by weight, of the total composition.

3. The aqueous dry-erasable ink composition of claim 1, wherein the composite pigment comprises at least one of an organic or inorganic pigment.

4. The aqueous dry-erasable ink composition of claim 1, wherein the polymer resin is one of thermoset, thermoplastic, epoxy, polyurethane, polyester or acrylic resins.

5. The aqueous dry-erasable ink composition of claim 1, wherein the water-soluble resin is one of polyvinyl alcohol, modified cellulose grades, hydroxyethyl, hydroxymethyl cellulose, xanthan and guar gums, polyacrylamide, corn starch, modified polyesters, modified polyethers, polyvinylpirrolidone or polyethyleneimine.

6. The aqueous dry-erasable ink composition of claim 1, wherein the water-soluble resin constitutes 0.05 wt % to 10 wt % of the total composition.

7. The aqueous dry-erasable ink composition of claim 1, wherein the wetting agent is one of an amphoteric wetting agent, a non-ionic wetting agent or an anionic wetting agent.

8. The aqueous dry-erasable ink composition of claim 1, wherein the wetting agent is one of polyoxyethylene alkyl phenyl ether, polyoxyethylene alkyl ester, polyoxyethylene alkylamine, polyoxyethylene alkylamide, polyoxyethylene propylene block polymer, sorbitan fatty acid ester, polyoxyethylene sorbitan fatty acid ester, an ethylene oxide adduct of acetylene alcohol, anionic surfactant as sodium polyacrylate, ammonium polyacrylate or sodium lauryl ester sulfate.

9. The aqueous dry-erasable ink composition of claim 1, wherein the wetting agent constitutes 0.05 wt % to 5 wt % of the total composition.

10. The aqueous dry-erasable ink composition of claim 1, wherein the rheology additive is one of carboxymethyl cellulose, ethyl cellulose, methyl cellulose, xanthan gum, guar gum, agar, acrylic thickeners, associative thickeners or inorganic thickeners.

11. The aqueous dry-erasable ink composition of claim 1, wherein the rheology additive constitutes 0.05 wt % to 3 wt % of the total composition.

12. The aqueous dry-erasable ink composition of claim 1, wherein the pH adjuster is one of metal hydroxides, carbonates, hydrocarbonates, quaternary ammonium bases and their salts, diethanolamine, triethanolamine or phosphates of alkali metals.

* * * * *